(12) United States Patent
Kojima et al.

(10) Patent No.: US 7,765,888 B2
(45) Date of Patent: Aug. 3, 2010

(54) STEERING APPARATUS

(75) Inventors: Takahiro Kojima, Kashihara (JP);
Masao Hamano, Yamatotakada (JP);
Nobushige Takada, Sakurai (JP);
Akihiro Toshima, Nabari (JP)

(73) Assignee: Jtekt Corporation, Osaka (JP)

( * ) Notice: Subject to any disclaimer, the term of this patent is extended or adjusted under 35 U.S.C. 154(b) by 870 days.

(21) Appl. No.: 11/271,960

(22) Filed: Nov. 14, 2005

(65) Prior Publication Data

US 2006/0102416 A1 May 18, 2006

(30) Foreign Application Priority Data

Nov. 15, 2004 (JP) .............................. 2004-330913

(51) Int. Cl.
*F16H 35/00* (2006.01)

(52) U.S. Cl. .................................. 74/388 PS

(58) Field of Classification Search ............. 74/388 PS; 384/537, 517, 559
See application file for complete search history.

(56) References Cited

U.S. PATENT DOCUMENTS

| 3,661,032 A | 5/1972 | Jenvey |
| 4,106,363 A | 8/1978 | Buckingham |
| 4,125,298 A * | 11/1978 | Heurich et al. ............... 384/537 |
| 4,815,329 A | 3/1989 | Ansgar et al. |
| 4,990,000 A * | 2/1991 | Harsdorff .................... 384/542 |
| 6,900,564 B2 * | 5/2005 | Kobayashi et al. ............ 310/83 |
| 2003/0103704 A1 | 6/2003 | Nieman et al. |

FOREIGN PATENT DOCUMENTS

| JP | 55-132449 | 3/1954 |
| JP | 62-24130 | 2/1987 |
| JP | 3-55924 | 5/1991 |
| JP | 7-43130 | 8/1995 |
| JP | 09-066850 | 3/1997 |
| JP | 10-175559 | 6/1998 |
| JP | 11-105725 | 4/1999 |
| JP | 2002-145092 | 5/2002 |
| JP | 2003-148498 | 5/2003 |

* cited by examiner

*Primary Examiner*—Thomas R Hannon
*Assistant Examiner*—Justin Krause
(74) *Attorney, Agent, or Firm*—Rabin & Berdo, PC

(57) ABSTRACT

A steering apparatus comprises a bearing for supporting a pinion shaft so as to be rotatable and a high-rigidity member for holding the bearing in a state where it is positioned with respect to a housing. The housing comprises cylindrical first and second housings whose respective ends are fitted to each other. The first and second housings respectively comprise first and second receiving sections directly or indirectly receiving an outer ring of the bearing in an axial direction. The outer ring of the bearing is held between the high-rigidity member and the second receiving section, so that the axial movement of the bearing relative to the first and second housings is regulated.

15 Claims, 8 Drawing Sheets

STEERING APPARATUS

BACKGROUND OF THE INVENTION

1. Field of the Invention

The present invention relates to a rack-and-pinion steering apparatus having a so-called drop-in structure.

2. Description of Related Art

In a rack-and-pinion hydraulic power steering apparatus having a drop-in structure, for example, a valve housing for accommodating a hydraulic control valve incorporates the hydraulic control valve and a pinion shaft serving as an output shaft, to form a sub-assembly. The pinion shaft in the sub-assembly is then inserted into (dropped into) a pinion housing. The valve housing and the pinion housing are then connected to each other, to complete assembling work.

An outer ring in a bearing for supporting the pinion shaft is held along the axis of the pinion shaft between receiving sections respectively provided in the valve housing and the pinion housing. When the distance between the receiving sections is larger than the size in the axial direction of the outer ring, a clearance in the axial direction occurs between the receiving section and corresponding end surface of the outer ring. As a result, backlash may be produced along the axis of the pinion shaft against both the housings to produce abnormal sound at the time of steering. Further, response to production of a steering assist force is degraded in the case of steering.

Therefore, it is proposed that an elastic member such as a spring washer or rubber is interposed between the receiving section in the pinion housing and the corresponding end surface of the outer ring (see Japanese Unexamined Patent Publication No. 9-66850 (1997) and Japanese Unexamined Patent Publication No. 2002-145092, for example).

On the other hand, in order to apply a pre-load to the bearing for supporting the pinion shaft, it is proposed that an elastic member such as a belleville spring for urging the bearing in the axial direction is used (see, Japanese Unexamined Patent Publication No. 10-175559 (1998), for example).

However, the elastic member such as the spring washer or the rubber may be easily subjected to degradation such as fatigue due to changes with time. When the elastic member is degraded, a clearance in the axial direction may occur between the outer ring in the bearing and the corresponding receiving section.

The above-mentioned problem that abnormal sound is produced exists in not only the hydraulic power steering apparatus but also a manual power steering apparatus.

An object of the present invention is to provide a steering apparatus that can prevent abnormal sound from being produced over a long time period.

SUMMARY OF THE INVENTION

In order to attain the above-mentioned object, a preferred mode of the present invention provides a steering apparatus comprising a rack shaft being axially movable; a pinion shaft provided with a pinion meshed with the rack shaft; a bearing for supporting the pinion shaft so as to be rotatable; a housing accommodating the pinion shaft and the bearing; and a high-rigidity member for holding the bearing in a state where it is positioned with respect to the housing. The bearing comprises an outer ring. The housing comprises a cylindrical first housing having an end and a cylindrical second housing having an end. The end of the first housing and the end of the second housing are fitted to each other. The first housing and the second housing respectively comprise first and second receiving sections directly or indirectly receiving the outer ring of the bearing in an axial direction of the outer ring. The outer ring of the bearing is held between the high-rigidity member and the second receiving section, so that an axial movement of the bearing relative to the first and second housings is regulated.

The high-rigidity member is difficult to degrade even if it is employed for a long time period, so that it can be held over a long time period with the outer ring of the bearing positioned therein. Consequently, abnormal sound can be prevented from being produced over a long time period.

When a member plastically deformed by being pressed against the end surface of the outer ring of the bearing is used as the high-rigidity member, the plastically deformed member substantially functions as a rigid body. Consequently, the outer ring of the bearing can be held at its initial position over a long time period.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Preferred embodiments of the present invention will be described while referring to the accompanying drawings.

Figure 1:
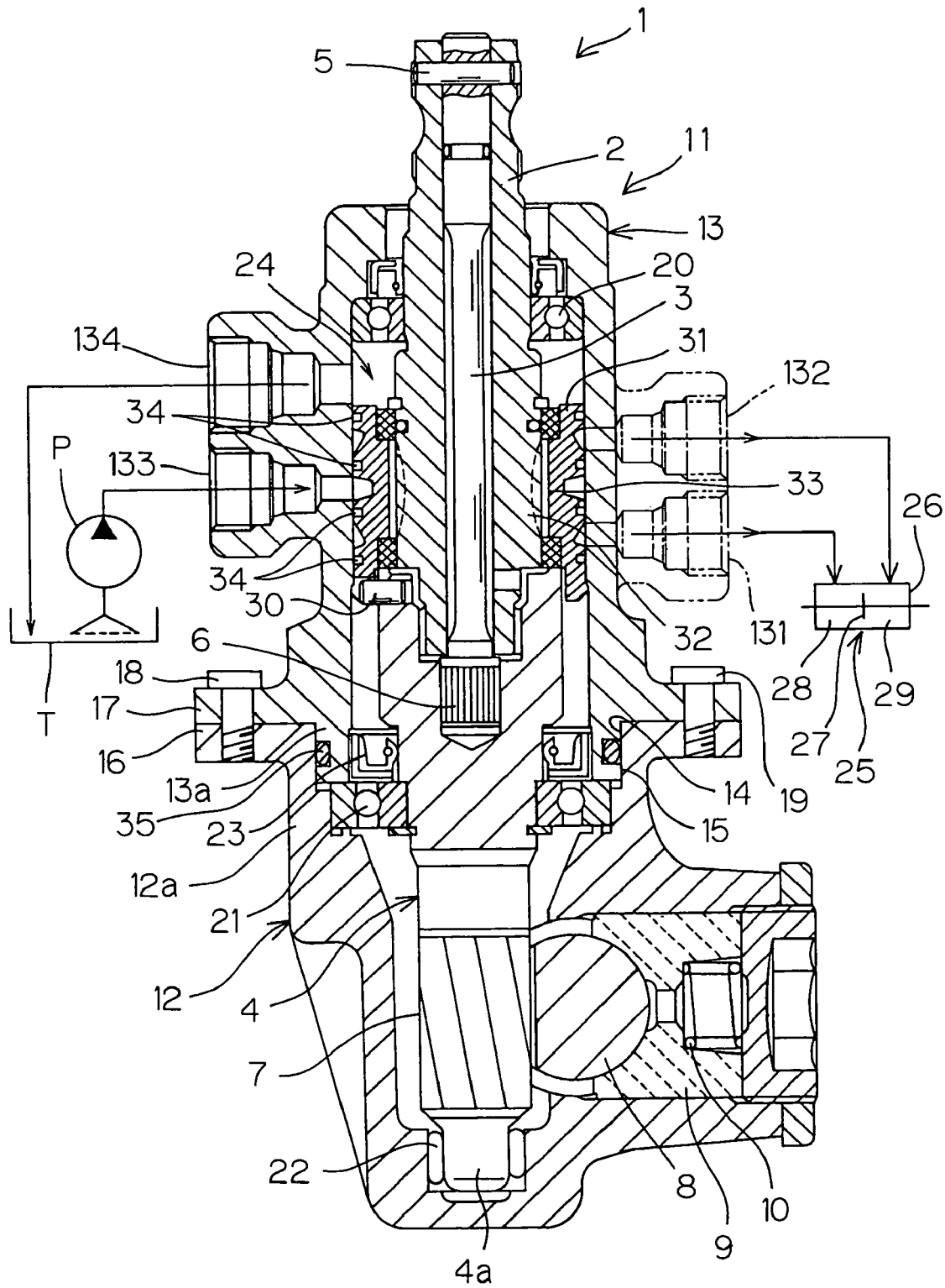
FIG. 1 is a schematic sectional view of a steering apparatus according to an embodiment of the present invention.

FIG. 1 is a schematic sectional view of a steering apparatus according to an embodiment of the present invention. Referring to FIG. 1, a rack-and-pinion hydraulic power steering apparatus 1 (hereinafter merely referred to as a steering apparatus 1) comprises an input shaft 2 connected to a steering member, and an output shaft 4 (a pinion shaft) connected to the input shaft 2 through a torsion bar 3. The torsion bar 3 is connected to the input shaft 2 through a pin 5 serving as a connecting member, and is connected to the output shaft 4 through a serration 6. Consequently, the input shaft 2 and the output shaft 4 elastically rotate relative to each other in response to steering torque.

A pinion 7 is formed integrally with the outer periphery of the output shaft 4 so as to concentrically rotate, and a rack shaft 8 meshed with the pinion 7 is connected to a wheel (not shown). The rotation of the input shaft 2 by steering is transmitted to the output shaft 4 through the torsion bar 3, and the rack shaft 8 is moved in the axial direction (a direction along the vehicle width, i.e., a direction perpendicular to paper in FIG. 1) by the functions of the pinion 7 and the rack shaft 8. The steering angle of the wheel is changed by the movement of the rack shaft 8. A support yoke 9 serving as a supporting member for supporting the rack shaft 8 is pressed against the rack shaft 8 by an elastic force of a spring 10 serving as an elastic member.

A housing 11 in the steering apparatus 1 is integrally constructed in combination of a first housing 12 composed of a pinion housing and a second housing 13 composed of a valve housing. The first housing 12 has the shape of a cylinder through which the output shaft 4 is inserted, and the second housing 13 has the shape of a cylinder through which the input shaft 2 is inserted. The first and second housings are formed of an aluminum alloy, for example.

An outer periphery 15 at one end 13a of the second housing 13 is fitted in an inner periphery 14 at one end 12a of the first housing 12, and an area between the inner periphery 14 at the one end 12a of the first housing 12 and the outer periphery 15 at the one end 13a of the second housing 13 is sealed with a sealing member 35 such as an O ring.

A pair of annular flanges 16 and 17 respectively formed at the one ends 12a and 13a of the first and second housings 12 and 13 are abutted against each other, and the annular flanges 16 and 17 are fastened to each other through bolts 18 and 19 serving as a plurality of fastening members. The plurality of bolts 18 and 19 are arranged with equal spacing along the circumference of the annular flange 16 (see FIG. 3).

Referring to FIG. 1 again, the input shaft 2 is supported so as to be rotatable by the second housing 13 through a bearing 20. The output shaft 4 is supported so as to be rotatable by the first housing 12 through first and second bearings 21 and 22 arranged on both sides with the pinion 7 sandwiched therebetween. The bearing 22 supports a front end 4a of the output shaft 4, and is composed of a rolling bearing such as a needle roller bearing. The bearings 20 and 21 are respectively composed of rolling bearings such as ball bearings.

An oil seal 23 for sealing an area between the outer periphery of the output shaft 4 and the inner periphery at the one end 13a of the second housing 13 is provided between an annular step formed in the output shaft 4 and the first bearing 21.

A rotary hydraulic control valve 24 is provided around the output shaft 4 at a position spaced in the axial direction from the pinion 7. A hydraulic cylinder 25 is provided as a hydraulic actuator for producing a steering assist force to which hydraulic pressure from the hydraulic control valve 24 is supplied.

The hydraulic cylinder 25 comprises a cylinder tube 26 formed at a part of a cylindrical housing, extended in a cross shape from the first housing 12, through which the rack shaft 8 is inserted, a piston 27 formed integrally with the rack shaft 8, and a pair of oil chambers 28 and 29 separated by the piston 27 serving as a partition.

The hydraulic control valve 24 is accommodated and held within the cylindrical second housing 13. The hydraulic control valve 24 has a cylindrical first valve member 31 connected to the output shaft 4 through a pin 30 serving as a connecting member so as to concentrically rotate, and a second valve member 32 provided integrally with the outer periphery of the input shaft 2 covered with the first valve member 31. The first valve member 31 rotates relative to the second housing 13, centered around the axis of the output shaft 4, as the output shaft 4 rotates.

The input shaft 2 and the output shaft 4 relatively rotate with twisting of the torsion bar 3 dependent on steering torque, so that both the valve members 31 and 32 relatively rotate. An area between both the valve members 31 and 32 is an inter-valve oil path 33. The inter-valve oil path 33 is connected to the oil chamber 28 in the hydraulic cylinder 25, the oil chamber 29 in the hydraulic cylinder 25, a pump P, and a tank T, respectively, through ports 131, 132, 133, and 134 provided in the second housing 13.

An outer peripheral surface of the first valve member 31 and an inner peripheral surface of the second housing 13 are parallel to a cylindrical surface concentric with the output shaft 4 and are opposed to each other with a very small clearance interposed therebetween. The very small clearance is sealed with a seal ring 34 among the ports 131, 132, 133, and 134. A drawn portion whose opening is changed depending on the relative rotation amount of both the valve members 31 and 32 is provided in the inter-valve oil path 33 such that the hydraulic pressure of pressure oil discharged from the pump P can be controlled depending on the relative rotation amount.

The pressure oil is supplied to one of both the oil chambers 28 and 29 in the hydraulic cylinder 25 depending on the steering direction, and flows back to the tank T through the hydraulic control valve 24 from the other oil chamber. Consequently, the hydraulic cylinder 25 is operated depending on the hydraulic pressure controlled by the hydraulic control valve 24, so that a steering assist force exerted on the rack shaft 8 is generated. Usable as the hydraulic control valve 24 are known ones.

Figure 2:
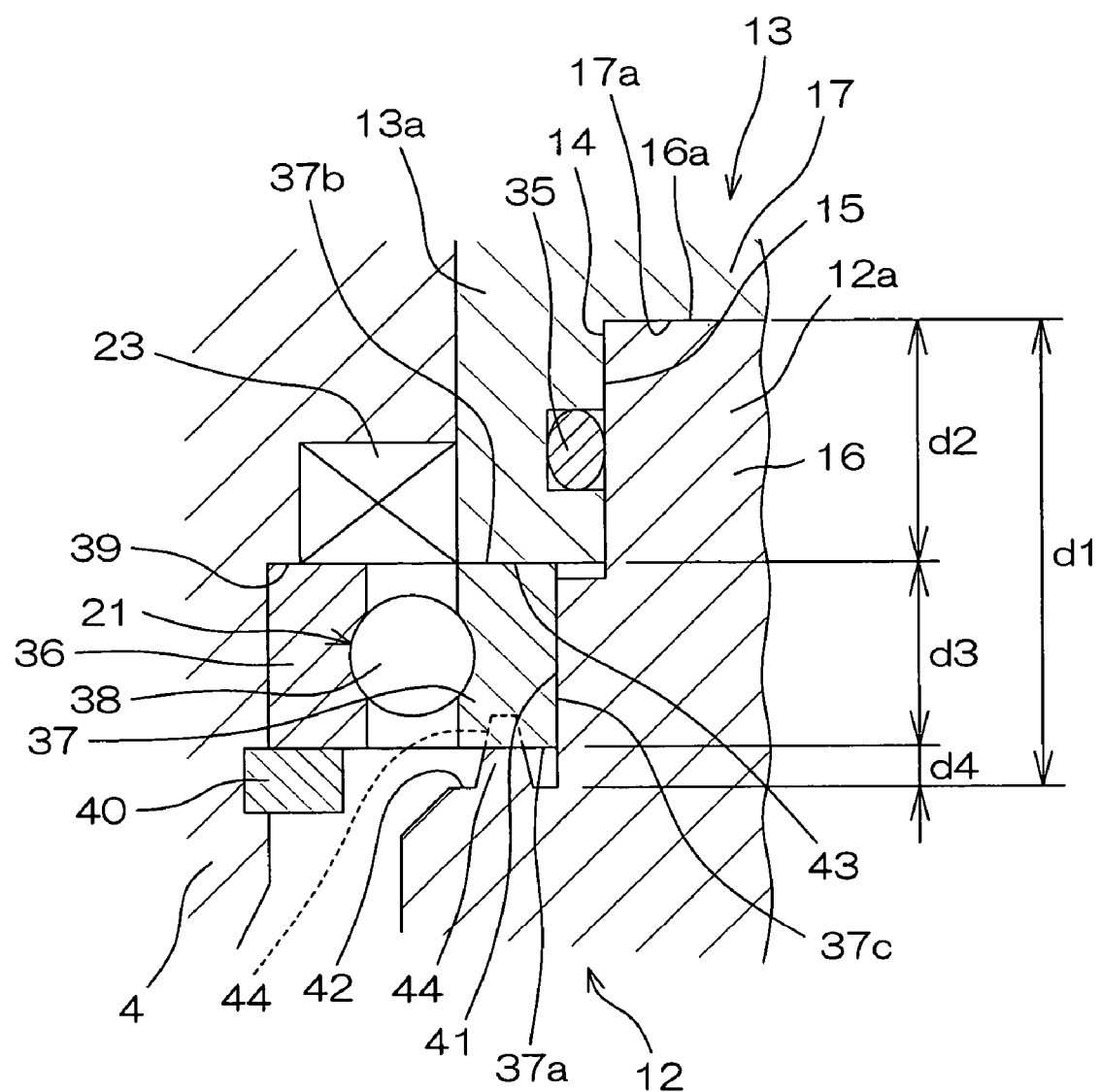
FIG. 2 is an enlarged sectional view of a principal part of FIG. 1.

Referring to FIG. 2 that is an enlarged view of a principal part of FIG. 1, the first bearing 21 has an inner ring 36, an outer ring 37, and a plurality of rolling members 38 interposed between the inner ring 36 and the outer ring 37. The inner ring 36 is fixed to the output shaft 4 by being sandwiched between an inner ring receiving section 39 composed of a step formed in the outer periphery of the output shaft 4 and a retaining ring 40 fitted in the outer periphery of the output shaft 4.

The outer ring 37 in the first bearing 21 has a first end surface 37a, a second end surface 37b, and an outer peripheral surface 37c. A bearing holding section 41 for holding the first bearing 21 is provided in the inner periphery 14 at the one end 12a of the first housing 12. The bearing holding section 41 is arranged adjacent to a portion fitted in the one end 13a of the second housing 13, and the outer ring 37 of the first bearing 21 is fitted therein and fixed thereto.

On the other hand, an annular step formed adjacent to the bearing holding section 41 in the first housing 12 constitutes a first receiving section 42 for receiving the first end surface 37a of the outer ring 37 of the first bearing 21. On the other hand, a second receiving section 43 for receiving the second end surface 37b of the outer ring 37 is provided on an end surface of the second housing 13.

The one end 13a of the second housing 13 is inserted into the first housing 12 by a predetermined depth. Opposite surfaces 16a and 17a of the annular flanges 16 and 17 in the first and second housings 12 and 13 are abutted with each other. In this state, a projection 44 formed in the first receiving section 42 is abutted against the first end surface 37a of the outer ring 37 in a state where it is plastically deformed by a predetermined amount. The projection 44 functions as a high-rigidity member providing a holding member for holding the bearing 21.

Figure 3:
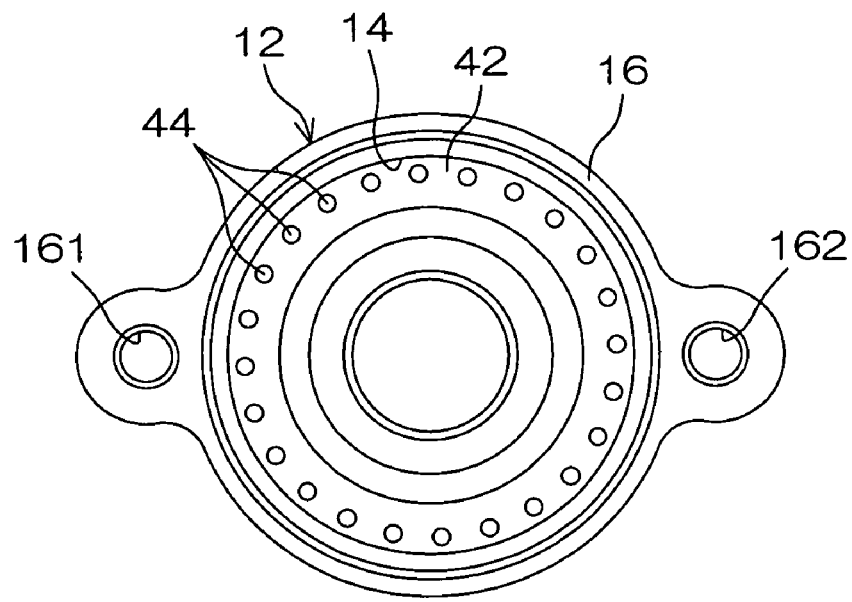
FIG. 3 is a plan view of a first housing.

Referring to FIG. 3, a plurality of projections 44 are provided with equal spacing along the circumference of the first receiving section 42 composed of an annular step. In FIG. 3, the annular flange 16 is formed with screw holes 161 and 162 to be screwed into the bolts 18 and 19.

Referring to FIG. 2 again, the projection 44 is compressed by interference fit at the first end surface 37a of the outer ring 37, to be plastically deformed when the first and second housings 12 and 13 are assembled. The plastically deformed projection 44 is abutted against the first end surface 37a of the outer ring 37. Consequently, the outer ring 37 is positioned and held in a state where the second end surface 37b of the outer ring 37 is abutted against the second receiving section 43 in the second housing 13.

Specifically, the projection 44 that is provided in the first receiving section 42 and is plastically deformed by a predetermined amount due to compression at the time of assembling both the housings 12 and 13 constitutes a holding section for holding the outer ring 37 in a state where it is positioned with respect to the second receiving section 43.

According to the present embodiment, the hydraulic control valve 24, the output shaft 4, the oil seal 23, and the first and second bearings 21 and 22 are incorporated into the second housing 13, to produce a sub-assembly. Thereafter, the output shaft 4 in the sub-assembly, together with the first and second bearings 21 and 22, is inserted into the first housing 12 (a drop-in process). After the drop-in process, the first and second housings 12 and 13 are only connected to each other using the bolts 18 and 19, respectively, to complete assembling. In such way, the assembling work is simplified.

The inner ring 36 of the first bearing 21 for supporting the output shaft 4 is fixed to the output shaft 4. The outer ring 37 is sandwiched between the receiving sections 42 and 43 in the first and second housings 12 and 13 at the time of the drop-in process. When the outer ring 37 is sandwiched, the projection 44 in the first receiving section 42 is plastically deformed by being compressed in the axial direction. Backlash along the axis of the output shaft 4 against the first and second housings 12 and 13 due to a processing tolerance or an assembling tolerance can be regulated by the plastically deformed projection 44. In other words, the projection 44 serving as a holding member (high-rigidity member) is plastically deformed so that an error in the processing tolerance or the assembling tolerance can be absorbed.

Specifically, referring to FIG. 2, a difference d4 (d4=d1−d2−d3) obtained by subtracting from a distance d1 between the first receiving section 42 and the opposite surface 16a of the annular flange 16 in the first housing 12 a distance d2 between the second receiving section 43 and the opposite surface 17a of the annular flange 17 in the second housing 13 and the height d3 of the outer ring 37 varies with the processing tolerance or the assembling tolerance. However, an amount of variation in the difference d4 is absorbed by an amount of plastic deformation of the projection 44. In FIG. 2, a broken line indicates an external form of the projection 44 that has not been plastically deformed.

The plastically deformed projection 44 allows the outer ring 37 to be positioned and held in the second receiving section 43 on the end surface at the one end 13a of the second housing 13. The plastically deformed projection 44 is difficult to degrade even in long-term use. Consequently, the outer ring 37 can be positioned and held at its initial position over a long time period. The manufacturing cost can be made low by merely providing the projection 44.

The first housing 12 formed with the projection 44 is composed of an aluminum alloy, and the outer ring 37 is composed of a bearing steel much harder than the first housing 12, so that the projection 44 can be reliably plastically deformed. The plastically deformed projection 44 substantially functions as a rigid body, and allows the outer ring 37 to be positioned and held at its initial position over a long time period.

Figure 4:
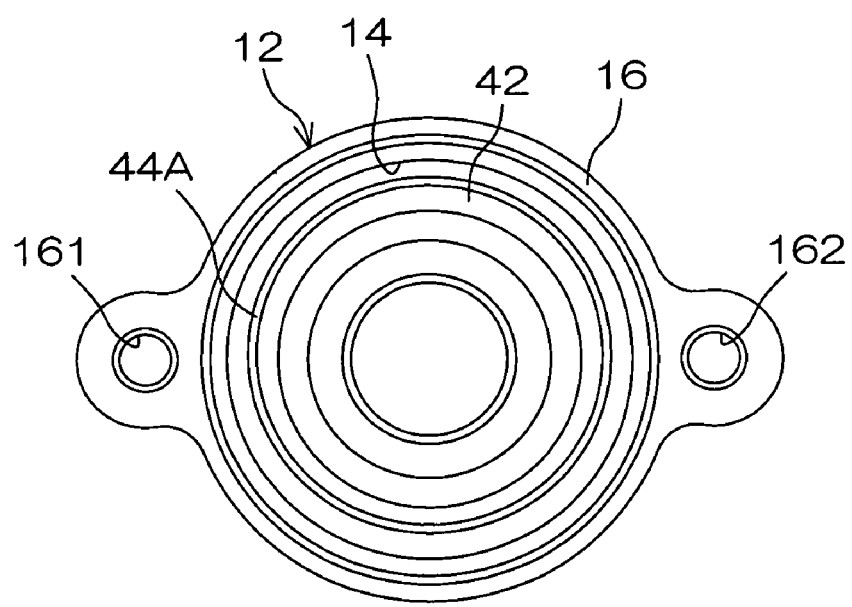
FIG. 4 is a plan view of a first housing according to another embodiment of the present invention.

In the embodiment shown in FIG. 3, the first receiving section 42 composed of an annular step may be provided with a projection 44A having an annular shape concentric with the first housing 12, as shown in FIG. 4.

Figure 5:
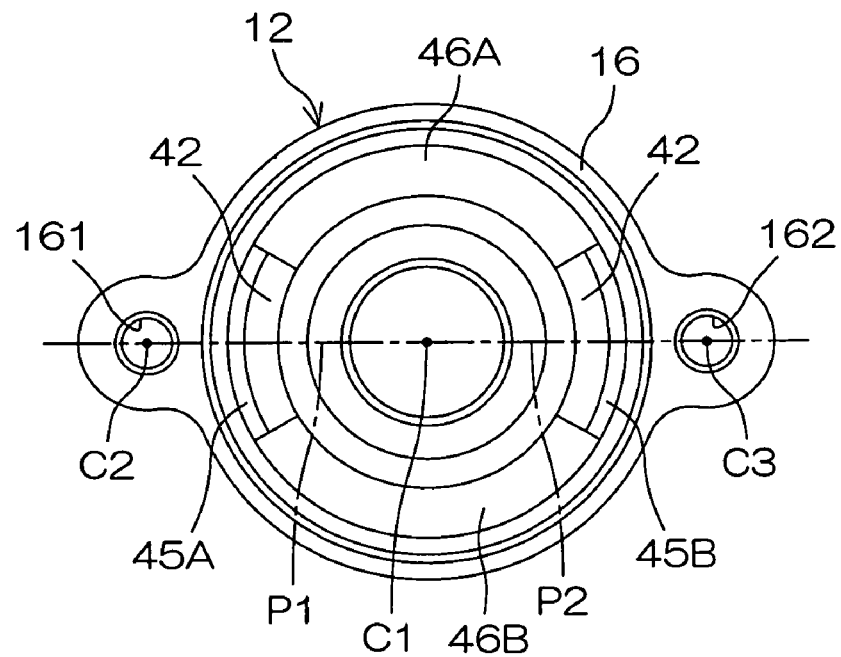
FIG. 5 is a plan view of a first housing according to still another embodiment of the present invention.

FIG. 5 then illustrates another embodiment of the present invention. In the present embodiment, the first receiving section 42 composed of an annular step may be provided alternately in the circumferential direction with a pair of projections 45A and 45B and a pair of recesses 46A and 46B, for example, extending in the circumferential direction. The paired projections 45A and 45B are arranged with equal spacing in the circumferential direction. The projections 45A and 45B are arranged, respectively crossing planes P1 and P2 including center C1 of the annular flange 16 and centers C2 and C3 of the corresponding bolts 18 and 19.

According to the present embodiment, by fastening the bots 18 and 19 at the time of fastening, the corresponding projections 45A and 45B can be reliably plastically deformed, respectively. Therefore, the outer ring 37 can be stably held in the axial direction between the projections 45A and 45B and the second receiving section 43.

Figure 6:
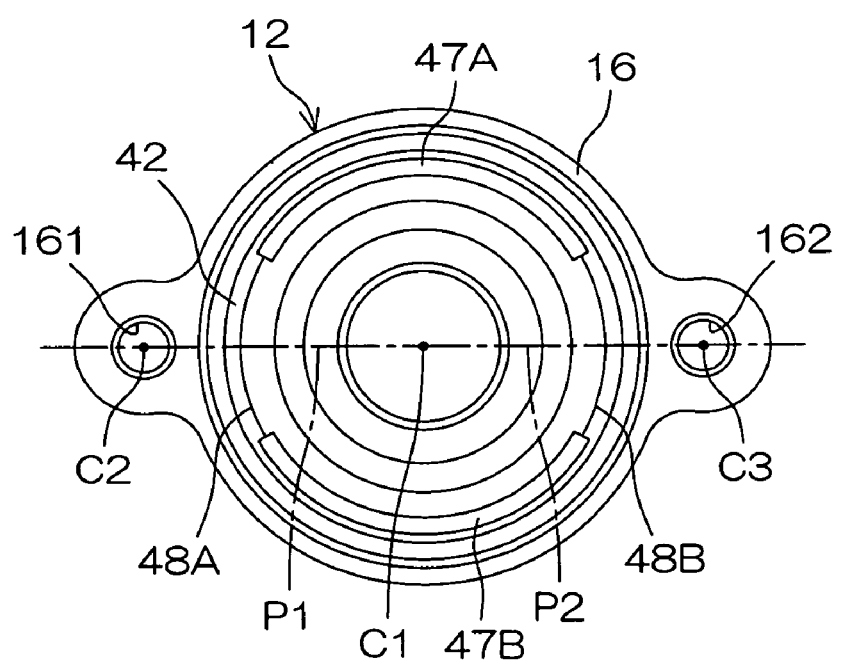
FIG. 6 is a plan view of a first housing according to still another embodiment of the present invention.

FIG. 6 then illustrates another embodiment of the present invention. In the present embodiment, a first receiving section 42 composed of an annular step is formed with a pair of recesses 47A and 47B, for example, extending in the circumferential direction, and the remaining part of the first receiving section 42 constitutes a pair of projections 48A and 48B, for example. The paired projections 48A and 48B are arranged with equal spacing in the circumferential direction, and the projections 48A and 48B are arranged, respectively crossing the planes P1 and P2 including the center C1 of the annular flange 16 and the centers C2 and C3 of the corresponding bolts 18 and 19.

According to the present embodiment, by fastening the bolts 18 and 19 at the time of fastening, the corresponding projections 48A and 48B can be also reliably plastically deformed, respectively. Therefore, an outer ring 37 can be stably held in the axial direction between the projections 48A and 48B and a second receiving section 43, as in the embodiment shown in FIG. 5.

Figure 7:
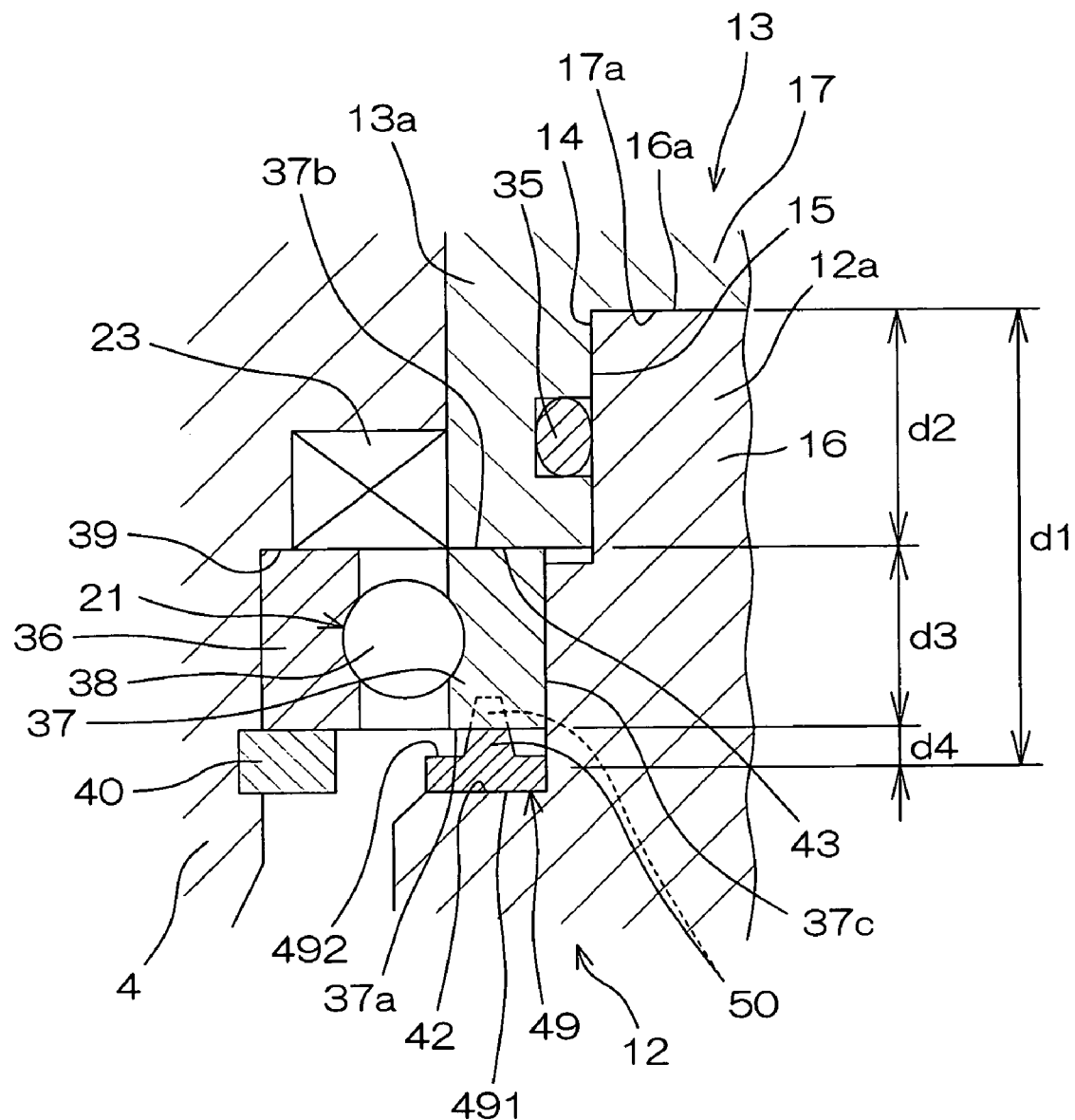
FIG. 7 is a cross-sectional view of a principal part of a steering apparatus according to still another embodiment of the present invention, where a spacer is used.

FIG. 7 then illustrates another embodiment of the present invention. Referring to FIG. 7, the present embodiment mainly differs from the embodiment shown in FIG. 2 in that the first housing 12 itself is provided with the projections 44 and 44A to be plastically deformed in the embodiment shown in FIG. 2, while an annular spacer 49 is interposed between the first receiving section 42 and the first end surface 37a of the outer ring 37 and is provided with a projection 50 to be plastically deformed as a high-rigidity member in the present embodiment.

Figure 8A:
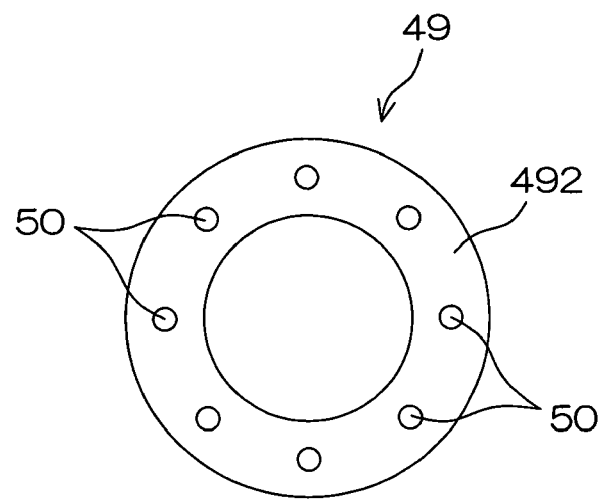
FIG. 8A is a plan view of the spacer in the embodiment shown in FIG. 7.
Figure 8B:
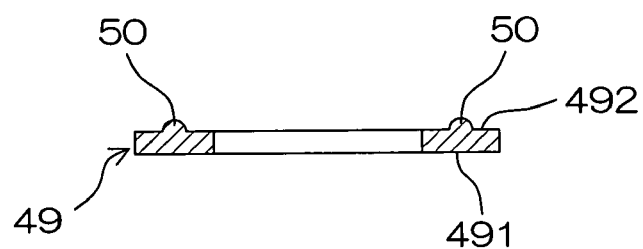
FIG. 8B is a cross-sectional view of the spacer.

The spacer 49 has a flat first surface 491 received by the first receiving section 42 and a second surface 492 opposed to the first surface 37a of the outer ring 37, and the second surface 492 is formed with the projection 50. A plurality of projections 50 are arranged with equal spacing along the circumference concentric with the annular spacer 49, as shown in FIGS. 8A and 8B. Used as the spacer 49 is a material that can be plastically deformed, abutted against a bearing steel of the outer ring 37, for example, an aluminum alloy. In the present embodiment, the same function and effect as those in the embodiment shown in FIG. 2 can be also produced.

Figure 9A:
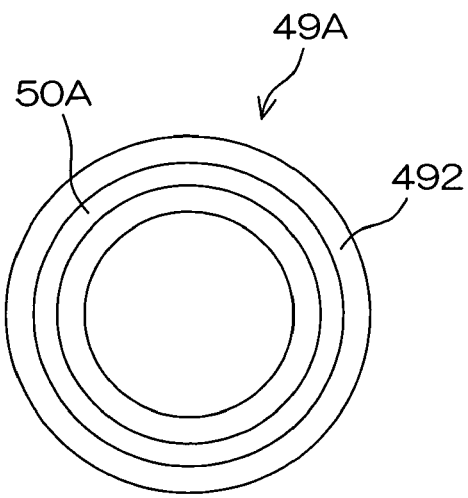
FIG. 9A is a plan view of a spacer in a steering apparatus according to still another embodiment of the present invention.
Figure 9B:
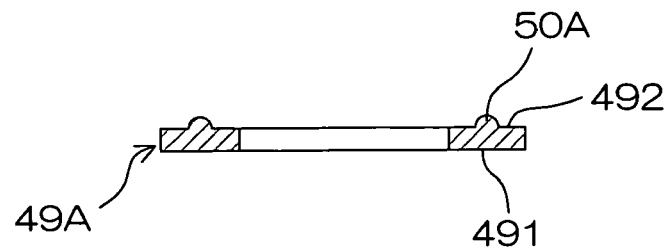
FIG. 9B is a cross-sectional view of the spacer in FIG. 9A.

The spacer 49 may be replaced with an annular spacer 49A concentrically having annular projection 50A, as shown in FIGS. 9A and 9B.

It goes without saying that the shape in the embodiment shown in FIG. 5 or 6 can be applied to the spacer 49.

Figure 10:
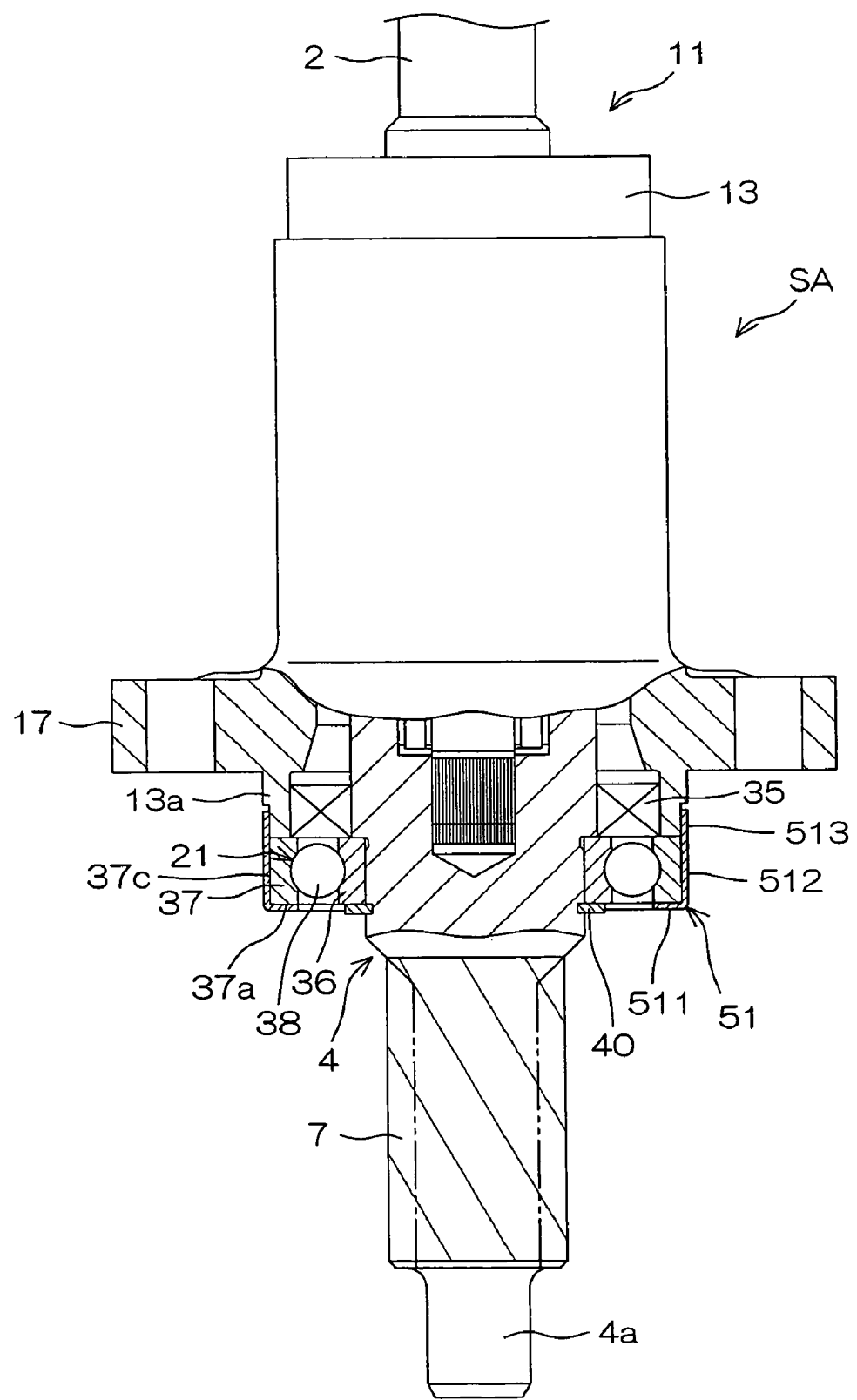
FIG. 10 is a partially sectional side view of a sub-assembly in a steering apparatus according to still another embodiment of the present invention.

FIG. 10 then illustrates another embodiment of the present invention. Referring to FIG. 10, in the present embodiment, a cover 51 made of a sheet metal, for example, surrounding a part of the outer ring 37 of the first bearing 21 is used as a holding member (a high-rigidity member). FIG. 10 illustrates the state of a sub-assembly SA that holds the first bearing 21 in a second housing 13 by the cover 51.

The cover 51 comprises a first portion 511 composed of an annular plate receiving the first end surface 37a of the outer ring 37, a cylindrical second portion 512 fitted on an outer peripheral surface 37c of the outer ring 37, and a cylindrical third portion 513 extended from the second portion 512 to the opposite side of the first portion 511. The one end 13a of the second housing 13 is fitted in a press-fit state in the third portion 513.

According to the present embodiment, the outer ring 37 can be positioned and held over a long time period in a second receiving section 43 in the second housing 13 by the cover 51 fixed to the second housing 13.

Figure 11:
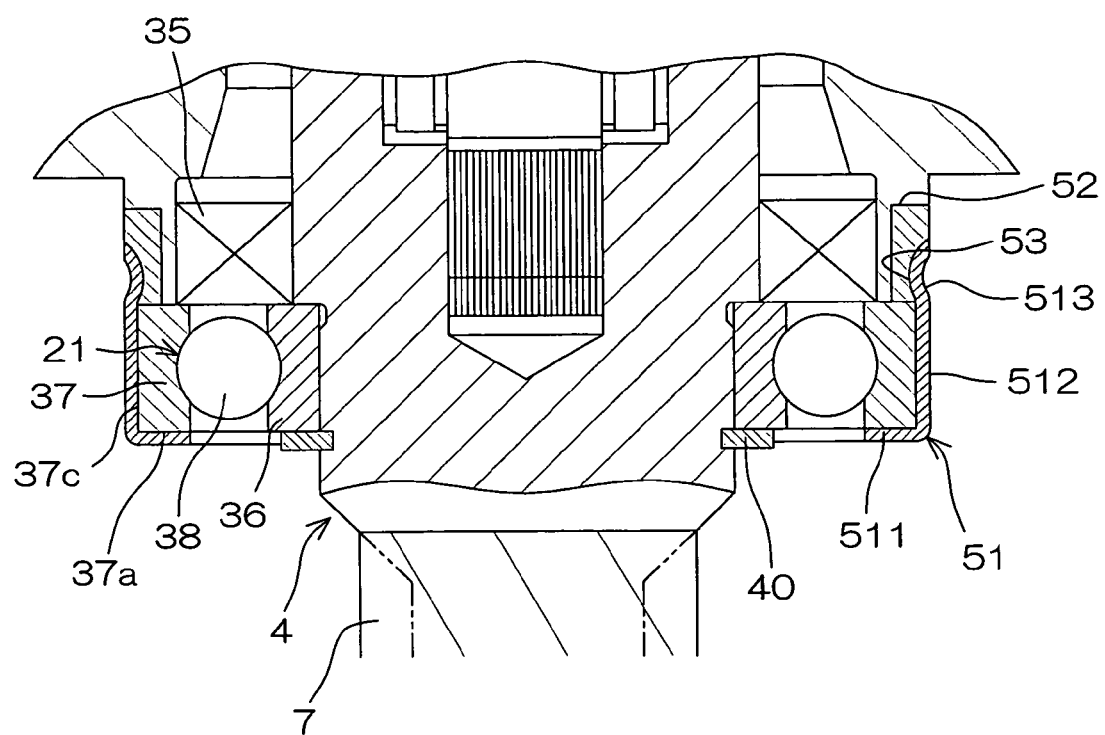
FIG. 11 is a partially sectional side view of a sub-assembly in a steering apparatus according to still another embodiment of the present invention, showing a modified example of the embodiment shown in FIG. 10.

In the embodiment shown in FIG. 10, in order to make the fixing of the cover 51 to the second housing 13 more reliable, an annular member 52 (made of copper or a copper alloy, for example) softer than the second housing 13 may be fitted on the outer periphery at the one end 13a of the second housing 13, and a third portion 513 may be caulked to the annular member 52, as shown in FIG. 11. That is, a caulking projection 53 provided intermittently or continuously along the circumference of the third portion 513 and projecting into the third portion 513 is formed. The annular member 52 may be abandoned, and the second housing 13 may be provided with a recess to directly caulk the third portion 513.

The present invention is not limited to each of the above-mentioned embodiments. For example, the second receiving section 43 composed of the end surface at the one end 13a of the second housing 13 can be also provided with a plastically deformable projection serving as holding means.

Furthermore, a bearing that supports the output shaft 4 between the pinion 7 and the hydraulic control valve 24 is not limited to a ball bearing, provided that it is a rolling bearing.

Although the present invention has been described and illustrated in detail, it is clearly understood that the same is by way of illustration and example only and is not to be taken by way of limitation, the spirit and scope of the present invention being limited only by the terms of the appended claims.

The present application corresponds to Japanese Patent Application No. 2004-330913 filed with the Japanese Patent Office on Nov. 15, 2004, the disclosure of which is hereinto incorporated by reference.

The invention claimed is:

1. A steering apparatus comprising
a rack shaft being axially movable;
a pinion shaft provided with a pinion meshed with the rack shaft;
a bearing for supporting the pinion shaft so as to be rotatable, the bearing including an outer ring;
a housing accommodating the pinion shaft and the bearing; and
a rigid member for holding the bearing in a state where it is positioned with respect to the housing, the rigid member being disposed on the housing and including a plastically deformable member plastically deformed by being pressed against an end surface of the outer ring of the bearing and creating an interference fit with the outer ring of the bearing,
the housing comprising a cylindrical first housing having an end and a cylindrical second housing having an end,
the end of the first housing and the end of the second housing being fitted to each other,
the first housing and the second housing respectively comprising first and second receiving sections directly or indirectly receiving the outer ring of the bearing in an axial direction of the outer ring,
the plastically deformable member including a plastically deformable projection formed integrally with the first receiving section in the first housing and being plastically deformed by a predetermined amount when the second housing is inserted into the first housing by a predetermined depth, and
the outer ring of the bearing being held between the rigid member and the second receiving section, so that an axial movement of the bearing relative to the first and second housings is regulated.

2. The steering apparatus according to claim 1, wherein the projection comprises a plurality of projections arranged annularly with spacing provided along a circumferential direction of the first housing.

3. The steering apparatus according to claim 2, further comprising
a pair of annular flanges respectively provided in the first housing and the second housing and fastened to each other, and
a plurality of fastening members for fastening the paired annular flanges to each other,
the plurality of projections arranged annularly with spacing provided along the circumferential direction of the first housing comprising a projection arranged across a plane including a center axis of the annular flange and a center axis of the corresponding fastening member.

4. The steering apparatus according to claim 2, wherein the plurality of projections are concentric with the first housing.

5. The steering apparatus according to claim 1, wherein the projection comprises an annular projection concentric with the first housing.

6. The steering apparatus according to claim 1, wherein the rigid member comprises an aluminum alloy.

7. The steering apparatus according to claim 1, further comprising
a spacer interposed between the first receiving section and the outer ring of the bearing,
the first receiving section receiving an end surface of the outer ring of the bearing through the spacer,
the plastically deformed member comprising a plastically deformable projection formed integrally in one piece with the spacer.

8. The steering apparatus according to claim 7, wherein the spacer comprises an annular spacer, and
the projection comprises a plurality of projections arranged annularly with spacing provided along a circumferential direction of the annular spacer.

9. The steering apparatus according to claim 7, wherein the spacer comprises an annular spacer, and
the projection comprises an annular projection concentric with the annular spacer.

10. The steering apparatus according to claim 1, wherein the rigid member comprises a cover surrounding a part of the outer ring of the bearing and fixed to the second housing.

11. The steering apparatus according to claim 10, wherein the cover comprises a first portion receiving an end surface of the outer ring and a cylindrical second portion fitted on an outer peripheral surface of the outer ring.

12. The steering apparatus according to claim 11, wherein the cover comprises a third portion extended from the second portion and fixed to the end of the second housing, and the third portion is opposite to the first portion with the second portion.

13. The steering apparatus according to claim 12, wherein the end of the second housing is fitted in a press-fit state in the third portion.

14. The steering apparatus according to claim 12, wherein a part of the third portion is caulked to a soft annular member fitted on the outer periphery at the end of the second housing.

15. The steering apparatus according to claim 14, wherein the soft annular member comprises copper.

* * * * *